Figure 1:
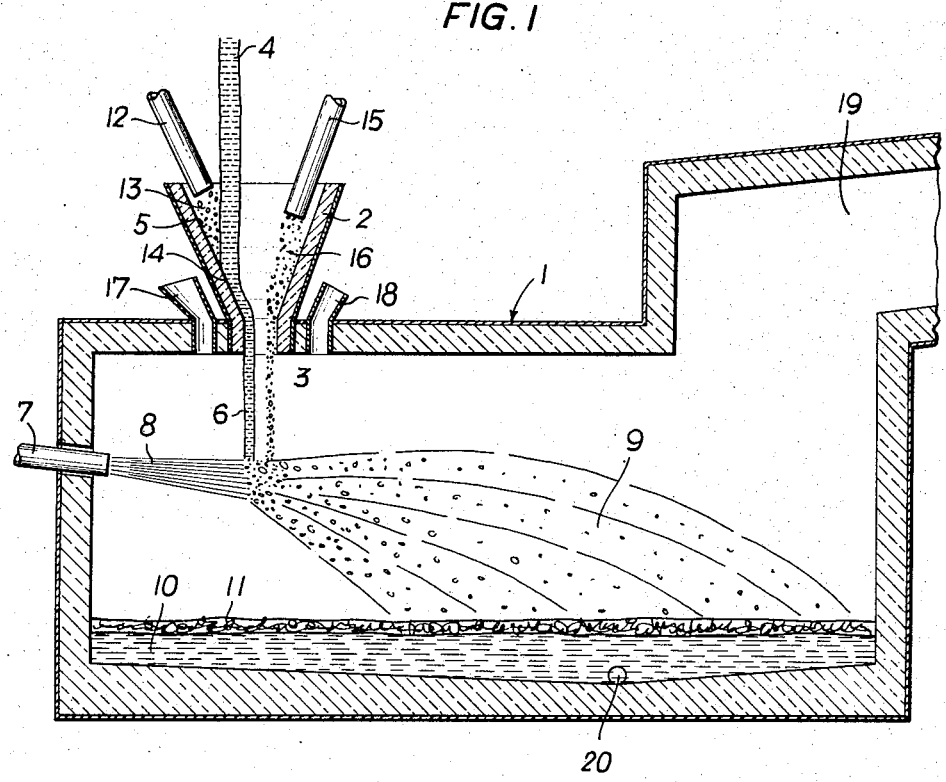

United States Patent
Hager

[15] 3,687,435
[45] Aug. 29, 1972

[54] PROCESS FOR REFINING LIQUID PIG IRON IN A SPRAY REFINING PLANT AND SPRAY REFINING PLANT FOR CARRYING OUT SUCH PROCESS

[72] Inventor: Alois Hager, Linz, Austria

[73] Assignee: Vereinigte Osterreichische Eisenund Stahlwerke Aktiengesellschaft, Linz, Austria

[22] Filed: Feb. 17, 1971

[21] Appl. No.: 116,117

[30] Foreign Application Priority Data

Feb. 20, 1970 Austria............................1557

[52] U.S. Cl............................266/34 T, 75/52, 75/60
[51] Int. Cl..............................................C21c 1/00
[58] Field of Search ......425/7; 75/45, 51, 52, 59, 60; 266/13, 34 R, 34 T, 39

[56] References Cited

UNITED STATES PATENTS 3,598,571    8/1971    Moffatt.........................75/60

Primary Examiner—Gerald A. Dost
Attorney—Granville M. Brumbaugh et al.

[57] ABSTRACT

The invention relates to a process for refining liquid pig iron in a spray refining plant, in which the pig iron is introduced into the refining vessel and the pig iron stream falling into the refining vessel is atomized by a horizontally blown in refining gas jet under formation of a spraying cone, and additions, such as lime, lime stone, fluorspar, bauxite, ore and the like are added into the spraying cone, wherein the improvement resides in that the pig iron and, if desired, at least part of the additions are guided prior to atomization onto the slanting inner face of a supply funnel having a slit-shaped bottom opening and that the pig iron stream forming in the supply funnel is permitted to fall into the refining vessel under broadening of its profile in the form of a curtain and is brought into reaction contact with the spraying agent. Thus the advantage is achieved that the consumption of oxygen is lowered because the refining effect of the refining gas jet is essentially improved. Almost no oxygen is contained in the waste gas, and the yield is greatly increased.

6 Claims, 2 Drawing Figures

Patented Aug. 29, 1972

3,687,435

INVENTOR
ALOIS HAGER

BY Brumbaugh, Graves,
Donohue & Raymond
his ATTORNEYS

PROCESS FOR REFINING LIQUID PIG IRON IN A SPRAY REFINING PLANT AND SPRAY REFINING PLANT FOR CARRYING OUT SUCH PROCESS

The invention relates to a process for refining liquid pig iron in a spray refining plant, in which the pig iron is introduced into the refining vessel and the pig iron stream falling into the refining vessel is atomized by a horizontally blown in refining gas jet under formation of a spraying cone, and additions, such as lime, lime stone, fluorspar, bauxite, ore and the like, are added into the spraying cone; and to a spray refining plant for carrying out such process.

As compared to spray refining plants in which a vertical spraying cone is formed, spray refining plants operated according to this process have the advantage of a low construction height and affording an improved full reaction of slag and steel. Thus it was possible to lower the iron content of the slag and to obtain a higher iron yield; as compared to other steel manufacturing processes, however, the iron yield remained still too low.

Furthermore it was not possible to fully exploit the refining gas so that the waste gas contained too high amounts of oxygen. In order to avoid this disadvantage it had been attempted to guide the pig iron to the refining gas jet in the form of a stream of cylindrical shape which is as compact as possible, because it was believed that a fluttering or fanned up pig iron stream could be atomized and refined only in a non-uniform manner. In order to be able to atomize such a closed pig iron stream of about circular cross-section in an improved and more reliable manner by the refining gas jet, it has been proposed to provide the refining gas jet with a U-shaped cross-section. Thus a more uniform formation of the spraying cone was achieved. It has, however, been found that the insufficient refining effect of the refining gas jet and the insufficient exploitation of the refining gas caused thereby were not improved. A further problem resides in that the pig iron easily froze in the inlet funnel. In such cases the refining process had to be interrupted and the whole funnel had to be exchanged.

The invention is aimed at avoiding these disadvantages and difficulties and in a process of the kind defined in the introduction resides in that the pig iron and, if desired, at least part of the additions are guided prior to atomization onto the slanting inner face of a supply funnel having a slit-shaped bottom opening and that the pig iron stream forming in the supply funnel is permitted to fall into the refining vessel under broadening of its profile in the form of a curtain and is brought into reaction contact with the spraying agent.

A preferred operation method is characterized in that the additions, in particular lime, are continuously introduced in the area where the pig iron hits onto the slanting inner face of the inlet funnel. This has the advantage that the heavily strained impingement zone of the funnel is protected by the additions, because they form, so to say, a cushion for the pig iron. Furthermore in this manner a good mixing of the additions and of the pig iron is achieved.

The other part of the additions may, if desired, also be fed to the pig iron stream formed in the inlet funnel.

The invention also relates to a spray refining plant comprising a refining vessel, at least one blowing lance arranged in the front wall of the refining vessel for blowing a refining gas, and a supply funnel for the supply of liquid pig iron arranged at a distance from the blowing lance axis and at a distance from the front wall, which plant is characterized in that the bottom of the supply funnel is designed to be slit-shaped, preferably as a rectangular slit, which slit extends transversely to the blowing lance or lances, respectively, the cross-section of the slit being greater than the cross-section of the broadening pig iron stream formed in the supply funnel so that the pig iron stream fills only part of the slit cross section during operation.

In order that the invention be more fully understood an embodiment thereof shall now be explained with reference to the accompanying drawing.

Figure 2:
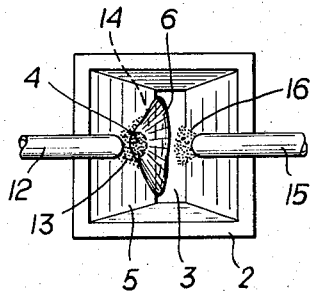

FIG. 1 is a vertical sectional view in longitudinal direction of the refining vessel of a spray refining plant and FIG. 2 is a top view of a supply funnel of a spray refining vessel according to FIG. 1.

Numeral 1 denotes a refining vessel and 2 is an inlet funnel of refractory material set into its cover. The inlet funnel 2 has a bottom opening 3 of rectangular cross-section (see FIG. 2). The pig iron stream 4 running from a ladle or any other container has, at first, an about circular cross-section and is guided onto the slanting inner face 5 of the inlet funnel. The pig iron runs off along this face so that the stream gets broader and assumes, when leaving the bottom opening 3, the fanned up form of the pig iron stream 6 and runs thus into the refining vessel. At the front wall of the refining vessel 1 a blowing lance 7 is built in from which a refining gas jet 8 is leaving. When the pig iron stream which is fanned up into a wide area in the manner of a "curtain" impinges with the refining gas jet, the pig iron is atomized under formation of a spraying cone 9 so that an excellent refining effect is achieved. On the floor of the refining vessel 1 the refined pig iron 10 and the slag 11 are collected.

Into the funnel 2, through a tube 12, lime 13 having a grain size of 0 to 25 mm is guided into the area of the impingement zone 14 of the pig iron stream 4 on the inner face 5 of the inlet funnel. Through a further tube 15 bauxite, fluorspar as slag formers, and ore and lime stone as coolants may continuously or discontinuously be added; the additions falling freely through the bottom opening 3 of the funnel are denoted with numeral 16. It has been shown that in a plant with a pig iron throughput of about 600 kg/min a bottom opening of 100 mm × 50 mm is an appropriate cross-section for a trouble-free supply of the pig iron and the necessary slag formers. No disturbances owing to freezing of the pig iron or to wear of the funnel occur. The refining vessel 1 may be provided with further chutes 17, 18 for the supply of fine-granular substances, such as small piece scrap. Numeral 19 denotes the gas off-take and numeral 20 denotes the tapping hole of the refining vessel.

The following tables show the operation results which were achieved in a spray refining plant in which oxygen-enriched pressurized air comprising 34 % oxygen was used as refining gas.

Table I contains comparative results obtained when a pig iron stream with a circular cross section is atomized. Table II contains the operation results obtained when a pig iron stream fanned up in the form of a curtain is atomized.

A comparison of the values will show that by the application of the process according to the invention (table II) the refining effect of the refining gas jet was materially improved. Thus the oxygen content in the waste gas was reduced almost to the value zero, and a better yield was obtained.

TABLE I

Results of trials gained when a pig iron stream with a circular cross-section was atomized.

|  |  | trial No. | | | | |
|---|---|---|---|---|---|---|
|  |  | 1 | 2 | 3 | 4 | 5 |
| C content of the pig iron | (%) | 4,3 | 4,1 | 4,2 | 4,1 | 4,3 |
| C content of the refined pig iron | (%) | 2,2 | 1,8 | 1,8 | 1,6 | 1,5 |
| oxidizing loss of C+Si+Mn+P | (%) | 3,3 | 3,5 | 4,2 | 4,2 | 5,0 |
| Oxygen-consumption standard cubic meters/m.t. of pig iron |  | 28,7 | 37,6 | 36,0 | 34,1 | 35,4 |
| waste-gas analysis |  |  |  |  |  |  |
| $O_2$ | (%) | 4,1 | 8,9 | 3,4 | 3,1 | 6,5 |
| $CO_2$ | (%) | 3,5 | 7,1 | 7,6 | 11,0 | 8,3 |
| CO | (%) | 46,4 | 29,5 | 34,9 | 34,0 | 27,4 |
| $H_2$ | (%) | 0,3 | 0,6 | 0,6 | 0,5 | 0,4 |
| yield of pre-refined pig iron, referred to the charged pig iron | (%) | 87,0 | 88,5 | 85,1 | 88,2 | 86,7 |

TABLE II

Results of trials gained when a pig iron stream fanned up in the shape of a curtain was atomized.

|  |  | trial No. | | | | |
|---|---|---|---|---|---|---|
|  |  | 6 | 7 | 8 | 9 | 10 |
| C content of the pig iron | (%) | 4,0 | 4,1 | 4,1 | 4,0 | 4,1 |
| C content of the refined pig iron | (%) | 2,5 | 2,2 | 2,3 | 1,6 | 1,7 |
| oxidizing loss of C+Si+Mn+P | (%) | 3,7 | 3,9 | 4,1 | 4,4 | 4,5 |
| Oxygen-consumption standard cubic meters/m.t. of pig iron |  | 21,8 | 22,0 | 23,0 | 30,8 | 30,2 |
| waste-gas analysis |  |  |  |  |  |  |
| $O_2$ | (%) | 0,3 | 0,3 | 0,4 | 0,2 | 0,6 |
| $CO_2$ | (%) | 18,4 | 16,2 | 15,3 | 21,9 | 17,7 |
| CO | (%) | 8,2 | 10,8 | 9,0 | 16,2 | 12,4 |
| $H_2$ | (%) | 0,6 | 0,7 | 0,5 | 0,4 | 0,3 |
| yield of pre-refined pig iron, referred to the charged pig iron | (%) | 92,6 | 92,2 | 94,4 | 90,0 | 89,5 |

What I claim is:

1. In a process for refining liquid pig iron in a spray refining plant, in which pig iron is permitted to fall into a refining vessel where it is atomized by a horizontally blown in refining gas jet under formation of a spraying cone, and additions selected from the group comprising slag forming agents and coolants are added into the spraying cone, the step of guiding the pig iron prior to atomization onto a slanting inner face of a supply funnel having a slitshaped bottom opening and permitting the pig iron forming a stream of broadening profile in said supply funnel to fall into said refining vessel in the form of a curtain and bringing it thus into reaction contact with the refining gas jet.

2. The process set forth in claim 1, wherein together with the pig iron at least part of the additions are guided onto the slanting inner face of the funnel.

3. The process set forth in claim 1, wherein at least part of the additions are continuously introduced in the area where the pig iron hits upon the slanting inner face of the inlet funnel.

4. The process set forth in claim 1, wherein part of the additions is guided onto the slanting inner face of the funnel while an other part is fed to the pig iron stream formed in the inlet funnel.

5. A spray refining plant for refining liquid pig iron comprising a closed refining vessel, at least one blowing lance arranged in a front wall of the refining vessel for substantially horizontal injection of a refining gas, a supply funnel having a slanting inner face and arranged at a distance from and substantially in vertical alignment with the blowing lance axis and at a distance from said front wall and conveying means adapted to direct liquid pig iron onto said slanting inner face and supply admixtures, the supply funnel having a bottom opening in the shape of a slit extending transversely to the axis of said at least one blowing lance to allow formation of a broadening stream of pig iron, said slit having a cross-section which is greater than the cross-section of said broadening stream of pig iron so that the pig iron stream occupies only part of the slit cross-section.

6. The spray refining plant set forth in claim 5, wherein the slit of the funnel is a rectangular slit.

* * * * *